March 31, 1953 E. B. POLLARD ET AL 2,632,988
STALK CUTTER
Original Filed Oct. 20, 1947 2 SHEETS—SHEET 1

INVENTOR.
ERNEST B. POLLARD
THEODORE J. BORCHARDT
BY
Williamson & Williamson
ATTORNEYS

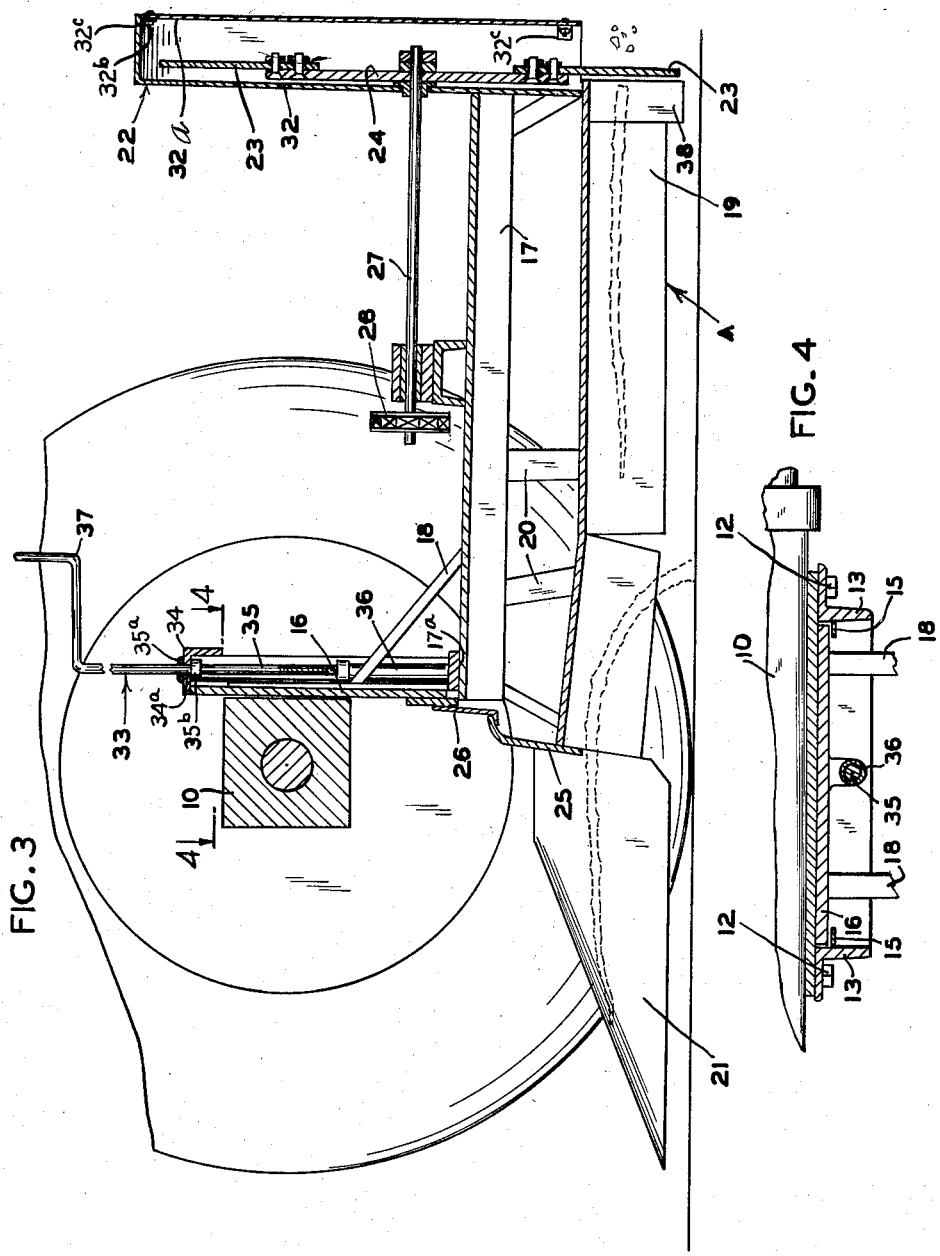

Patented Mar. 31, 1953

2,632,988

UNITED STATES PATENT OFFICE 2,632,988

STALK CUTTER

Ernest B. Pollard, Sherburn, and Theodore J. Borchardt, Welcome, Minn.

Original application October 20, 1947, Serial No. 780,910. Divided and this application August 15, 1949, Serial No. 110,364

5 Claims. (Cl. 55—118)

This invention relates to a machine or unit for disintegrating or comminuting standing crop stalks in the field and for scattering the particles formed.

This application is a division of the subject matter disclosed in applicants' copending application Serial No. 780,910, filed October 20, 1947, now Patent No. 2,479,510, issued August 16, 1949.

In row crops, such as corn and cotton, harvesting is accomplished by picking the matured product from the standing stalks. The harvesters used are mounted on vehicles and leave most of the stalks standing with the leaves and branches thereon, after harvesting. These stalks remain in the ground usually, until fall or spring planting when attempt is made to plow the stalks under. While considerable of the stalks may be plowed under, this operation is generally unsuccessful, leaving portions of the stalk exposed or above the surface of the soil.

Various insects, such as weevils, infest the exposed portions of the stalk and deposit larvae therein which hatch during the next crop season, causing very serious damage to the next crops. The menace of infestation is a very serious one to growers of cotton, corn and other products.

It is an object of our invention to provide a simple and highly efficient unit which may be attached to a tractor or other farm vehicle and supported or drawn thereby or which may be embodied in a separate vehicle to operate upon one or more rows of harvested stalks standing in the field and to very finely disintegrate the same by cutting or slicing action and to further, disperse and scatter the fragments behind the vehicle on which the unit is mounted.

Another object is the provision of a stalk-disintegrating unit for row crops which, through travel of a vehicle over the ground, along one or more rows, first bends the stalks forwardly close to the ground, then engages the same and guides the bent stalks longitudinally of the machine into a power operated cutter or slicing mechanism which slices the stalks, branches and leaves into fine fragments and scatters the same rearwardly of the associated vehicle.

It is a further object to provide a stalk-disintegrator of the class described wherein one or more of said cutting units may be easily adjusted vertically of the vehicle or other support therefor and wherein simple, efficient provision is made for driving the cutter mechanism at high speed from a power take-off or driving medium furnished by the vehicle.

A further and related object is the provision of a machine or unit of the type described wherein the stalks, branches and leaves of row crops are progressively and rapidly cut into small fragments of such size as to be readily plowed below the surface of the soil and wherein, after disintegration of the stalks, the particles are scattered in a cloud behind the machine.

These and other objects and advantages of our invention will be more apparent from the following description made in connection with the accompanying drawings wherein like reference characters refer to similar parts throughout the several views and in which:

Fig. 3 is a longitudinal vertical sectional view taken substantially along the line 3—3 of Fig. 2;

Fig. 4 is a horizontal section view taken substantially along the line 4—4 of Fig. 3.

Figure 1:
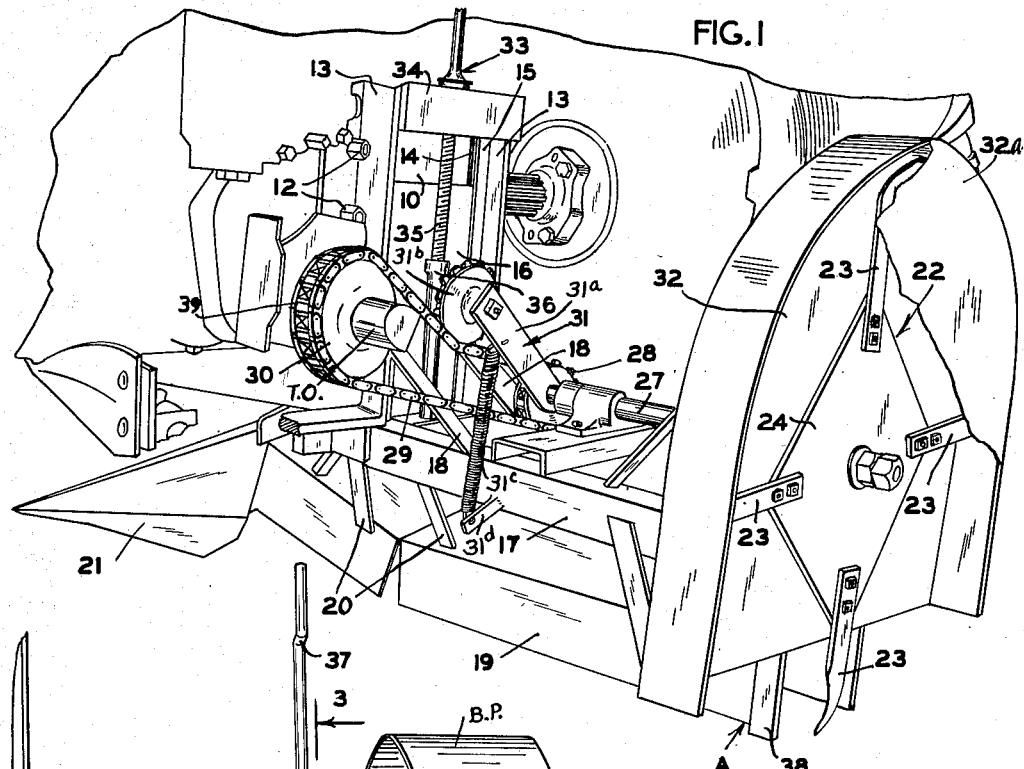
Fig. 1 is a side perspective view showing one form of our stalk disintegrator as mounted on a tractor.

In Figs. 1 through 4, we show one form of our stalk disintegrator machine. This form will be designated by the letter A and is adapted to be attached in a single unit directly to the rear axle housing of a tractor. In said Figs. 1 through 4, a portion of a conventional farm tractor is illustrated having a rear axle housing 10 with a pair of spaced vertically disposed heavy straps 11 fixed as by welding 11a to the rear side of said housing. Each of these straps 11 is equipped with a pair of outstanding threaded studs 12 to which a pair of spaced angles 13 are adapted to be secured by a nut being threadably engaged on each of said studs 12 to hold said angles 13 in vertically disposed spaced parallel relation, the free legs of said angles outstanding from said axle housing 10 in opposed relation to each other. A slide 14 is formed on the inner opposed leg of each of said angles 13 as by welding a pair of strips 15 respectively thereto. A vertical carriage 16 is slidably mounted in said slides 14 for vertical movement therein. A supporting frame 17 is fixed to the lower portion of said vertical carriage 16 as by being welded thereto at 17a and diagonal struts 18 are provided to strengthen this connection. The frame 17 extends horizontally and rearwardly of said carriage 16 and is disposed substantially longitudinally of the tractor.

Figure 2:
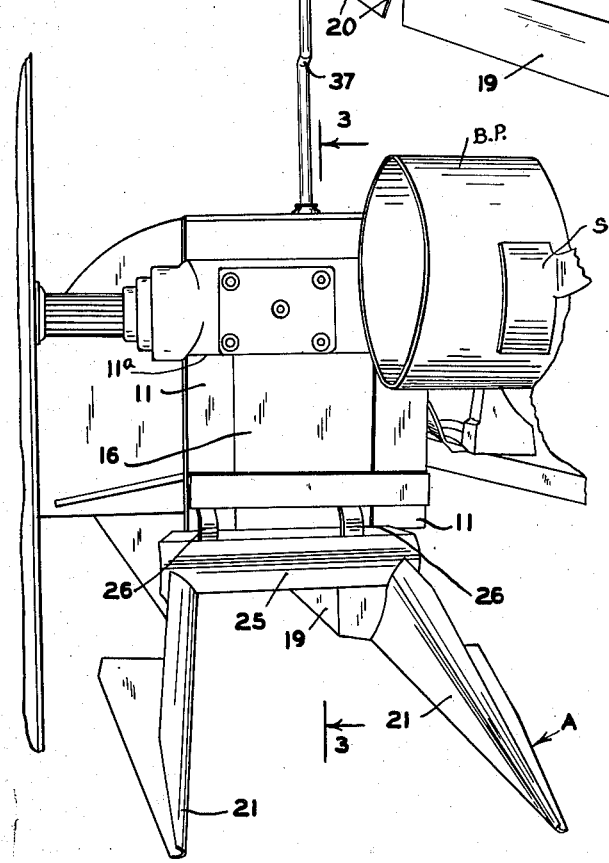
Fig. 2 is a front perspective view of the form of our invention illustrated in Fig. 1.

In the detail front view shown in Fig. 2, some conventional parts of the tractor having no part of our invention are illustrated, including the large belt-driving pulley B. P. which is disposed at the front of the differential casing and a conventional pulley-braking shoe S which is supplied in tractors for holding the pulley against rotation.

A stalk engaging guide in the general form of an inverted channel 19 having a pair of spaced longitudinally disposed parallel sides is fixed to said frame 17 as by the attachment bars 20 and extends therebelow. A pair of diverging stalk engaging shoes 21 are fixed at the forward end of said inverted channel 19. These shoes 21 diverge toward the forward ends thereof and converge at the rear ends thereof to guide the stalks into the channel 19. A stalk bending member such as the transverse bar 25 is mounted across the forward end of the inverted channel 19 between said diverging shoes 21 and said channel 19. The forward end of the channel 19 is disposed slightly above the rear portion thereof and slopes downwardly from the front as shown in Fig. 1. A suitable brace 26 is provided between said carriage 16 and said bending member 25 to securely hold said bar 25 in place.

A power-driven cutter mechanism is provided at the rear of said inverted channel 19 and in the form of our invention illustrated in the accompanying drawings, includes a rotary head 24 with slicer elements such as the blades 23 operated by said head 24. The slicer elements follow a path which is disposed transversely to the guided stalks and to the line of travel of the tractor. In the form of cutter illustrated these blades 23 follow a high speed rotary path, the lower portion of which passes across the rear end of inverted channel 19 to transversely slice the stalks as the machine passes over them. A protective cover 32 having a removable back plate 32a completely surrounds the cutter blades 23 and head 24 except for the extreme bottom portion thereof, the blades 23 extending a short distance below said cover 32 at the bottom of their rotary path. The back plate 32a as shown in Figs. 1 and 3 is of inverted U-shape to fit within the confines of the protective cover 32 and is removably attached to cover 32 by nutted bolts 32b which are secured to angle brackets 32c, fixed to the rearwardly facing flange of the cover 32.

In the form of cutter mechanism illustrated, the rotary head 24 of the cutter 22 is fixed to a power-driven shaft 27 which is journaled in suitable bearings and extends forwardly of said head 24. A sprocket wheel 28 is fixed at the forward end of said shaft 27 and chain 29 is trained thereon and is also trained over a second sprocket wheel 30 of larger diameter which is driven directly by the power take-off T. O. of the tractor. A suitable resilient belt tightener 31 is provided to maintain the desired tension in said chain 29. The belt tightener 31 as shown in Fig. 1, comprises a link 31a pivoted upon the forward portion of shaft 27 and carrying at its outer end, a rotary idler sprocket or wheel 31b which engages the upper leaf of the endless chain 29. The link 31a is urged downwardly by a coil spring 31c, the lower end of which is affixed to a lug or bracket 31d connected with one of the lower members of the frame 17.

The clearance between the ground and the stalk engaging elements of our machine consisting of the forwardly diverging shoes 21, inverted channel 19, and lower extremities of the cutter blades 23 can be adjusted by a single vertical adjustment mechanism 33. An angle bar 34 is fixed transversely across the top portions of the vertically disposed spaced angles 13 and has an aperture 34a through the central horizontal portion thereof. An externally threaded adjustment rod 35 is mounted through said aperture for rotation on a vertical axis and is provided with a pair of collars 35a and 35b respectively fixed to said rod 35 and slidably mounted on opposite sides of the horizontally disposed leg of said angle bar 34 surrounding the aperture therein through which said rod 35 extends. An internally threaded sleeve 36 is fixed to the rear face of carriage 16 and is adapted to threadably receive the externally threaded adjustment rod 35. A suitable crank handle 37 is provided at the top of rod 35 to rotate the same and thereby adjust the height of said carriage 16 and the clearance between the ground and the above-mentioned stalk engaging elements of our mechanism.

*Operation*

The following is a description of the operation of form A of our invention. The height of the stalk engaging elements is initially adjusted to maintain the the optimum clearance between said elements and the ground. This adjustment is made by turning the crank 37 to screw the carriage 16 up or down; the frame 17 and the stalk engaging elements being mounted on said carriage 16, move up and down therewith. When the proper adjustment has been made the tractor is driven across a field from which a crop which leaves a stalk standing such as corn or cotton has been picked.

A row of stalks is longitudinally aligned with the inverted channel 19 and the diverging shoes 21 guide the stalks into said channel 19 as the machine progresses along the row. The stalk bending member 25 engages the stalks at a point slightly above the ground and bends the same forwardly. The inverted channel 19 passes forwardly over the bent stalks to guide them rearwardly butt-end first back to the slicer mechanism 22. By using a large sprocket wheel 30 on the power take-off shaft and a small sprocket wheel 28 on the drive shaft 27, the rotary stalk slicer illustrated can be driven at a relatively high speed of between 700 and 1,000 revolutions per minute.

As the stalks are engaged by the cutter blades, they are transversely sliced into finely comminuted fragments. The butt-ends of the stalks are initially sliced to cut the stalks, with their branches and leaves thereon, free from the ground and their roots. Thereafter the machine passes over the cut stalks and the inverted channel 19 continues its guiding function to confine the stalks and hold the same transversely to the path of the cutter blades and to feed said stalks into said blades. The cutter blades then disintegrate the stalks, branches and leaves into finely comminuted fragments which are spread over the ground by the motion imparted to them by the cutter blades which also act as spreaders.

The optimum adjustment of the cutter blades relative to the ground is to place them so that they just engage the top of the hills in which the stalks are growing, whereby the best operation of the machine is obtained. If the cutter blades extend too deeply into the ground, the added resistance will slow them up and if they do not engage the ground, the cutting efficiency of stalks which are lying on the ground surface is materially reduced.

It should be noted that the rear extremities of the depending flanges of inverted channel 19 are reinforced with heavy straps 38 rigidly fixed to the outer surface thereof as by welding. The cutting edge of the slicer blades 23 is slightly concaved in shape and will have a shearing effect on the stalks against the inner rear edge of the side of channel 19 in addition to the cutting action of said blades 23. The blades 23 are disposed in very slightly spaced relation to the rear extremity of channel 19 so that it is obvious that there will be this shearing action although it is not in any way necessary to the successful operation as the blades 23 will slice most of the stalks before they reach the side of the channel 19.

As best shown in Fig. 1, a second driving sprocket wheel 39 is fixed to the power-take-off T. O. of the tractor and is adapted to have a second driving chain 40 (see Fig. 4) trained thereon to drive a similar stalk disintegrator unit (not shown) which can be mounted on the other side of the tractor axle 10 in spaced parallel relation to the previously described unit, the spacing between the units being equal to the spacing between the stalk rows. This will permit two rows of stalks to be comminuted simultaneously each time the tractor is driven across the field.

What we claim is:

1. A stalk disintegrating and spreading attachment for mounting and support upon a vehicle such as a tractor having a power takeoff, said attachment comprising a rigid supporting frame mounted upon and disposed longitudinally of the vehicle, stalk guiding, confining and feeding mechanism rigidly fixed to the bottom of said supporting frame and depending therefrom and extending generally horizontally and open at forward end and bottom, said mechanism including a transverse stalk bending element adjacent the forward portion thereof, stalk cutting mechanism supported in fixed relation upon said supporting frame and disposed at the rear end of said stalk guiding and feeding mechanism to receive therefrom, mechanism interposed between said supporting frame and the frame of the vehicle for raising and lowering said supporting frame and with it as a rigidly interconnected unit said stalk handling and cutter mechanism relative to the ground over which the vehicle travels and for retaining said supporting frame in desired, vertically adjusted positions, said cutting mechanism having means for driving connection with the power takeoff of the vehicle whereby when the vehicle moves longitudinally of a row of stalks, the same are engaged, bent, guided and fed in a substantially horizontal position to the cutting mechanism and then progressively disintegrated and spread over the ground.

2. A stalk disintegrating and spreading attachment for mounting and support upon a vehicle such as a tractor having a power takeoff, said attachment having in combination a rigidly interconnected, bodily shiftable unit comprising a rigid supporting frame for support connection with the vehicle longitudinally thereof, an inverted generally channel shaped stalk confining and feeding mechanism fixed to the bottom portion of the said frame and depending therefrom and stalk cutting mechanism supported in fixed relation upon said supporting frame and disposed at the rear end of said stalk handling mechanism to receive therefrom, mechanism for mounting said supporting frame upon the frame of the vehicle with freedom for vertical adjustment of said supporting frame relative to the ground over which the vehicle travels and raising and lowering means interposed between said supporting frame and said vehicle frame for vertically adjusting said supporting frame relative to the ground and for retaining said supporting frame and the mechanism rigidly affixed thereto in a number of adjusted relations, said cutting mechanism having means for driving connection with the power takeoff of the vehicle whereby when the vehicle moves longitudinally of a row of stalks, the same are engaged, bent, guided and fed in a substantially horizontal position to the cutting mechanism and then progressively disintegrated and spread over the ground.

3. A stalk disintegrating attachment for mounting and support upon a vehicle such as a tractor, having a source of power thereon, said attachment having in combination a supporting frame for traversing the ground longitudinally of at least two rows of stalks, means for mounting said supporting frame upon the vehicle with freedom for vertical adjustment of said supporting frame relative to the ground over which the vehicle travels, raising and lowering means interposed between said supporting frame and the frame of the vehicle for adjusting the height of said supporting frame relative to the ground, a pair of horizontally spaced, rigidly interconnected stalk disintegrating units mounted on said supporting frame, said units being spaced apart the distance between two rows of stalks and each including stalk engaging, stalk bending and feeding mechanism rigidly affixed to said supporting frame and a power operated cutting mechanism fixedly supported by said supporting frame adjacent the rear end of said stalk feeding mechanism, each of said stalk cutting mechanisms including a cutter shaft and driving connections extending between said cutter shafts and the power takeoff of the vehicle, all mechanisms of said two stalk disintegrating units being rigidly interconnected by said frame for bodily shifting up and down as a unit into a working position with reference to the ground and into an elevated, non-operative position.

4. A stalk disintegrator and spreader for mounting and support upon a vehicle such as a tractor having a power takeoff, said vehicle having a frame, said device comprising an adjustment mounting for rigid attachment to the vehicle frame, a supporting frame supported from and below said mounting for disposition longitudinally of the vehicle, stalk-guiding-confining and feeding mechanism rigidly fixed to the bottom of said supporting frame and depending therefrom and extending generally horizontally and open at forward end and bottom, said mechanism including a transverse stalk-bending element adjacent the forward portion thereof, stalk cutting mechanism secured in fixed relation upon said supporting frame and disposed at the rear end of said stalk handling mechanism to receive therefrom, mechanism interposed between said mounting and said supporting frame for raising and lowering said supporting frame and with it, as a rigidly interconnected unit, said stalk handling and cutter mechanism relative to the ground over which the vehicle travels, said cutter mechanism having means for driving connection with the power takeoff of the vehicle whereby when the vehicle moves longitudinally of a row of stalks, the same are engaged, bent, guided and fed in a substantially horizontal position to the cutting mechanism and then progressively disintegrated and spread over the ground.

5. Stalk-disintegrating and spreading mechanism for mounting and support upon a vehicle such as a tractor having a power take-off, said mechanism comprising a rigid adjustment mounting for support from and attachment to the under portion of the vehicle frame, a supporting frame mounted for vertical adjustment in said mounting and extending longitudinally of the vehicle in spaced relation to the ground, horizontal, stalk-guiding, confining and feeding mechanism rigidly affixed to the under portion of said supporting frame in the nature of a rigid, substantially continuous, inverted channel having a flaring forward end for gathering, and confining stalks and having a much narrower, stalk-delivery end at the rear thereof, said mechanism including adjacent its forward end a stalk bending portion or element, rotary stalk-disintegrating mechanism secured in a fixed relation upon said supporting frame and disposed at the rear end of said stalk-guiding, confining and feeding mechanism to receive therefrom, mechanism interposed between said supporting frame and the frame of said vehicle for bodily raising and lowering the mechanisms mounted on said supporting frame with said supporting frame and for locking and retaining said supporting frame and the said mechanisms rigidly affixed thereto in a number of vertically adjusted horizontal relations, said cutting mechanism having means for driving connection with the power take-off of the vehicle whereby when the vehicle moves longitudinally of a row of stalks, the same are gathered, bent, guided and fed at a substantially horizontal position to the cutting mechanism and the successively presented stalks are progressively disintegrated and spread over the ground and when said raising and lowering means is operated, the height of the frame and the mechanisms carried thereby is adjusted and retained relative to the ground over which the frame passes.

ERNEST B. POLLARD.
THEODORE J. BORCHARDT.

REFERENCES CITED

The following references are of record in the file of this patent:

UNITED STATES PATENTS

| Number | Name | Date |
|---|---|---|
| 370,616 | Gilpin et al. | Sept. 27, 1887 |
| 657,411 | Hamm | Sept. 4, 1900 |
| 1,059,404 | Spiva | Apr. 22, 1913 |
| 2,302,973 | Sargent | Nov. 24, 1942 |
| 2,479,510 | Pollard et al. | Aug. 16, 1949 |